Patented Aug. 14, 1951

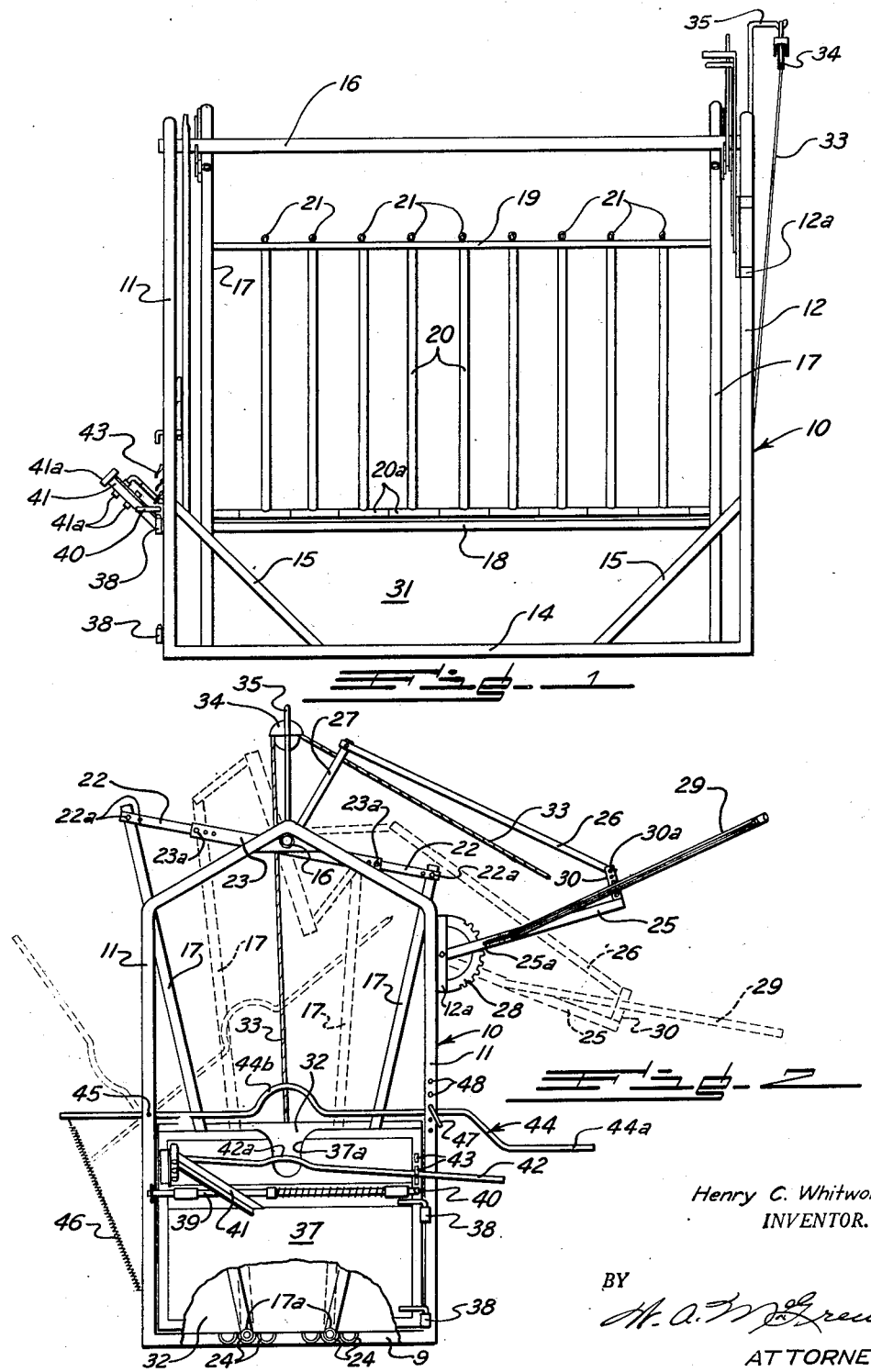

2,564,317

UNITED STATES PATENT OFFICE 2,564,317

CATTLE CHUTE

Henry C. Whitworth, Scott City, Kans.

Application July 14, 1947, Serial No. 760,838

2 Claims. (Cl. 119—98)

The present invention relates to a cattle chute. It has to do particularly with an adjustable and portable sturdy enclosure for receiving animals, such as cattle, and temporarily confining them to permit handling of the animals, by veterinarians and others, without the danger of the animal shifting its position materially during the time an operation is being performed upon it by a veterinary or while being treated in other ways.

One of the objects of the present invention is to provide an improved portable cattle chute of the foregoing character which is of relatively simple construction, relatively inexpensive to manufacture, and one which is of sufficiently sturdy construction to temporarily confine the largest and strongest of cattle and other animals when it is desirable to subject them to examinations, treatments, or to handling of various kinds.

Another object of the present invention is to provide an improved cattle chute having side wall sections which are readily adjustable or movable inwardly and outwardly to decrease or increase the usable space within the chute, dependent upon the size of the animal to be temporarily confined within said chute; it being a further object of the present invention to provide said movable side wall sections with a series of pivotally mounted upright members which are capable of being moved or shifted to permit access to different parts of the animal temporarily confined within the chute.

Another object of the present invention is to provide means for supporting and operating the movable and adjustable side wall sections of the cattle chute which are adjustable relatively to one another so as to vary the amount of movement toward one another and away from one another which the sections can be made to travel.

A further object of the present invention is to provide an improved cattle chute having preferably a vertically slidable rear entrance door and a preferably pivotally mounted or hingedly supported front exit door with separate means for controlling the movement of said doors, together with movable side wall sections or portions each of which is provided with independently movable means permitting access to different parts or portions of an animal within the chute, and separate movably mounted means capable of being brought into contact with the neck and nose portions of the animal to hold its head in the desired position and at the desired angle.

Another object of the present invention is to provide an improved cattle chute formed from metal, preferably tubular pieces or length of metal, which is of sturdy and relatively simple construction, containing relatively few parts and thus being relatively inexpensive to manufacture.

The foregoing and other objects and advantages of the present invention will appear from the following description and appended claims, when considered in conjunction with the accompanying drawings forming a part of this specification wherein like reference characters designate corresponding parts in the several views.

In said drawings:

Fig. 1 is a side elevational view of one form of improved cattle chute embodying the present invention; and Fig. 2 is a front elevational view of the same.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood, also, that the phraseology or terminology employed herein is for the purpose of description and not of limitation, and it is not intended to limit the invention claimed herein beyond the requirements of the prior art.

Referring now particularly to the drawings, the improved cattle chute of the present invention comprises, as shown, a substantially rectangular or oblong preferably metal frame structure, indicated as a whole at 10. At the front of the frame structure there is provided a substantially arch-shaped upright frame member 11 and at the rear a generally similar arch-shaped frame member or section 12. As shown, these frame sections or portions are preferably of tubular cross section, although angle iron or channel members may be employed. The upright portions of the end frame members 11 and 12 are connected at their lower ends to longitudinal ground-engaging members 14. Angle brace members 15 connect the longitudinal members 14 with the upright portions of the end frames 11 and 12, see particularly Fig. 1.

Extending longitudinally between the upper arch-shaped portions is a preferably tubular member or bar 16 which is preferably rotatably connected at its opposite ends to the upright frame members 11 and 12. The tubular member 16 provides, in addition to being a supporting member for the structure, means for supporting the adjustable actuating connections to the upper ends or end portions of the side wall sections of the chute, now to be described.

As seen in the drawings, each side wall section comprises a front and rear upright, preferably tubular member 17, these being connected together in spaced relationship by means of a longitudinal bar or member 18 spaced upwardly from the longitudinal ground-engaging frame member 14. A generally similar longitudinal brace or spacer member 19 is provided in the region of the upper ends of the upright members 17. A longitudinally extending pin or rod (not shown) extends in substantial parallelism to the member 18 and above the same in relatively close relationship and provides means for receiving and supporting the base portions 20a of a series of inverted substantially T-shaped members 20. As seen in Fig. 1, a series of these inverted T-shaped members 20 is placed end to end and the supporting rod or pin (not shown) mentioned above is telescoped inside the tubular base portions 20a of these members. Thus, they are hingedly or swingably supported upon said longitudinal rod member. The members 20 are held in their normal upright or closed positions by means of removable pins or members 21 which extend downwardly through openings formed in the longitudinal brace member 19 and telescope or fit within the end portions of the tubular members 20. It will be understood that by removing a pin 21, one of the members 20 can be swung outwardly away from the remainder of the side wall section without disturbing any of the other members 20, the swinging movement being about the pin or support which extends through the end portion or head 20a.

Both side wall sections are preferably the same and the upper ends of each of the two pairs of upright frame members 17 are adjustably mounted upon or connected to transverse bars or rods 22, see Fig. 2, whose inner ends are movably connected to the outer ends of a transverse or crosswise extending bar or member 23. With reference to Fig. 2, it will be seen that the upright members 17 and the transverse members 22 are adjustably connected together preferably by removable pins or fasteners 22a. The members 22 themselves are held to the member 23 in adjusted relationship by virtue of pins or the like 23a. By virtue of this structure, the side wall sections including the pairs of uprights 17 may be spread further apart or moved closer together and held in such positions by the adjustment means, such as the pins or the like 22a and 23a.

The main or central transverse members 23, it being understood that one such member is provided for each pair of uprights 17 located adjacent the front and rear ends of the structure, are fixedly connected for swinging or rocking movement with the longitudinal preferably tubular member 16. These connections may be of any desired type so that movement of the members 23 and their attached pairs of end members 22 in a rocking action will impart oscillation or rotation to the member 16. Thus the members are capable of being moved from the full line position of Fig. 2 to the broken line positions shown in this figure, and vice versa. It will be understood, of coures, that the end portions of the longitudinal supporting member 16 are rotatably or oscillatably mounted or journalled in suitable bearings carried by the arch-shaped upper ends of end frame members 11 and 12 as shown in Fig. 2. This movement of the members 22, 23 and 16 effects, when the movement is in a clockwise direction as viewed in Fig. 2, the movement inwardly or toward one another of the two side wall sections as indicated in broken lines in Fig. 2.

The lower ends of the upright side wall or frame members 17, namely the lower ends 17a thereof, are preferably seated in sockets 24 provided in or carried by end transverse or cross frame members 9 which connect the ground-engaging longitudinal frame members 14.

The side wall sections are shifted toward one another or away from one another by means of actuating mechanism carried preferably by the upright rear end frame member 12. Such mechanism, as shown, includes pivotally connected together members or bars 25, 26, and 27, the member 25 being pivotally connected to a bracket 12a carried by the upright 12 and carrying a latch 25a adapted to engage any one of a series of notches formed in a segment 28 carried by the members 12 and 12a. An operating handle or lever 29 projects outwardly from the member 25 and since the member 27 is rigidly connected to the oscillatable longitudinal tube or member 16, movement of the handle 29 in either direction will shift the member 16 and its attached members 23 and 22 and, of course, in turn the side wall sections of the chute. The member 25 carries a rigidly mounted projecting member or portion 30 to which the adjacent end of the member 26 may be attached, the connection between the members 26 and 27 being an adjustable one, as indicated by the cooperating pins and perforations 30a.

With the parts in their full line positions as shown in Fig. 2, movement of the handle 29 downwardly, or in a clockwise direction, would turn the longitudinal member 16 and shift the side wall sections and their attached parts from their full line positions, or spread apart locations, to a partially collapsed or closed position, as shown in broken lines. By this adjustment of the parts, the upright inverted T-shaped members 20 are brought into intimate engagement with an animal located within the chute and serve to apply a firm but not too strong pressure upon opposite sides of said animal to embrace the same.

If desired, both of the side wall sections below the longitudinal members 18 may be closed, preferably by a metal panel, or the like 31, Fig. 1. By viewing Fig. 2 it will be seen that the upright members 17 from their lower ends 17a, and the associated portions or remainder of the side walls or sections, may be moved together as units from their full line positions toward their broken line positions, thus applying a gradual pressure to the animal within the chute. By virtue of the panels 31 which, together with the slidable door or gate at the rear and the hinged door or gate at the front, serve to enclose the bottom portion of the chute, the animal within the chute is restrained from causing injury to anyone located outside the chute, as the result of kicking, or by other fractious actions.

The rear end of the chute is preferably closed at its lower portion only by means of a sliding gate or door 32 which is raised and/or lowered by means of a rope or cable 33 which is passed over a pulley 34 carried by an arm or bracket 35 supported from the framework of the chute. It will be understood that the door or closure member 32 is formed preferably from heavy metal and is capable of sliding in suitable guideways which may be carried by or which may form a part of the frame portion or section 12 of the chute.

The front end of the chute is closed at its lower portion preferably by a swinging door or gate 37 mounted upon one of the frame uprights 11 by hinge assemblies 38 so as to swing outwardly away from the frame. The gate is maintained normally in closed position by a spring pressed latch member 39 having an operating handle 40 at its right end, as viewed in Fig. 2. The upper portion of the gate 37 is provided with a cutout portion or notch 37a shaped so as to receive the throat or under neck portion of an animal within the chute.

The front face of the door carries a forwardly and upwardly inclined bracket member 41 having a series of sockets 41a formed therein, in either of which the offset downwardly turned end portion of a nose bar 42 is mounted. Thus, the nose bar 42 is spaced forwardly of and substantially parallel to the front side of the swinging gate 37 in position to have its arched or curved portion 42a brought into engagement with the nose of an animal whose neck is within the notch 37a. After the nose has been engaged properly, the bar or rod 42 is hooked under one of the retainer members or hooks 43 carried by the gate 37.

In association with the notch or cutout portion 37a of the front gate 37, there is provided a neck bar or rod 44 pivotally mounted at 45 upon one of the upright frame members 11. The neck bar has a handle portion or extension 44a at its right end and a tension spring 46 has one of its ends attached to the opposite end of the neck bar, with the other end of the spring being attached to frame member 11. The tendency of the spring 46 is to move the neck bar 44 about its pivot in a counter-clockwise direction. The neck bar is provided intermediate its ends with an arched or curved portion 44b which is adapted to cooperate with the notch 37a formed in the front gate 37. When an animal is in position within the chute, the neck bar 44 is swung downwardly from its out-of-use position until it engages the back of the animal's neck. Pressure in a downward direction on handle portion 44a serves to lower the animal's neck into the notch or cutout portion 37a. A securing pin or member 47 is then passed above the bar or rod 44 and inserted in one of the holes or openings 48 in frame member 11 to hold the neck bar in intimate engagement with the neck of the animal.

With the parts in closed and latched position, it will be understood that an animal may be held in a substantially rigid or immovable condition within the chute. By virtue of the hinged or pivoted members 29, 29a of the two side wall sections of the chute, any one or more of these members may be swung downwardly away from the animal to provide direct access to portions of its body.

By virtue of the several sockets 24 shown at the bottom of Fig. 2 of the drawings, it will be understood that the normal space between the lower ends of the side wall sections may be varied or adjusted when desirable so that the chute of the present invention will accommodate itself to animals of different size.

While one preferred form of the present invention has been illustrated in the accompanying drawings, merely by way of example, it is to be understood that various modifications and changes of the form shown and described are possible. All such modifications and changes as are within the scope of the hereunto appended claims are deemed to be a part of this invention.

Having thus described the invention, what is claimed is:

1. A cattle chute comprising a substantially rectangular metal frame structure having a sliding gate at its rear end and a swinging gate at its front end, substantially arch-shaped frame members at the front and rear ends of said frame structure, a longitudinal bar connecting the arch-shaped frame members together at their upper ends, side wall sections movably connected with said longitudinal bar, means for moving the side wall sections toward or away from one another, means for operating the sliding gate, means for operating the swinging gate, a neck bar carried by the frame structure and movable into contact with the neck of an animal within the chute, a forwardly and upwardly inclined bracket on one side of said swinging gate, a plurality of socket members on said bracket, a nose bar having one downwardly turned end for selective engagement in one of said socket members, and a plurality of members on the opposite side of said swinging gate for selective engagement with the other end of said nose bar to hold the nose of said animal.

2. A cattle chute comprising a platform, a substantially rectangular tubular metal frame structure having substantially arch-shaped frame members at the front and rear ends thereof, a longitudinal shaft rotatably suspended between said arch-shaped frame members, a plurality of depressions on said platform, side wall sections pivotally supported in selected pairs of said depressions, linkage means connecting upper extremities of said side wall sections to said longitudinal shaft, means for changing the effective length of said linkage means, a lever bar connected to said longitudinal shaft for moving said side walls toward and away from each other, a catch on said bar, a ratchet member adjacent said lever bar, a spring associated with said lever bar for urging said catch into engagement with said ratchet, a rope and pulley arrangement for operating said sliding gate, bearing members on said swinging gate, a bar for translatory movement in said bearings, a catch member on one end of said bar, a shoulder on said bar, a spring coaxial with said bar compressed between one said bearing and said shoulder for urging said catch outwardly into engagement with said frame structure, a neck bar pivotally mounted on said frame structure, a plurality of holes in said frame structure, a pin for selective engagement in said holes to hold the free end of said neck bar in adjusted position, a spring for raising said neck bar to an out-of-use position when said pin is released, a forwardly and upwardly inclined bracket on one side of said swinging gate, a plurality of socket members on said bracket, a nose bar having one downwardly turned end for selective engagement in one of said socket members, and a plurality of members on the opposite side of said swinging gate for selective engagement with the other end of said nose bar to hold the nose of said animal.

HENRY C. WHITWORTH.

REFERENCES CITED

The following references are of record in the file of this patent:

UNITED STATES PATENTS

| Number | Name | Date |
|---|---|---|
| 733,874 | Reck et al. | July 14, 1903 |
| 1,166,450 | Dolan | Jan. 4, 1916 |
| 1,227,712 | Watson | May 29, 1917 |
| 1,805,405 | Kuhns | May 12, 1931 |
| 2,136,008 | Gregory | Nov. 8, 1938 |
| 2,396,928 | Parsons | Mar. 19, 1946 |
| 2,438,322 | McDonough | Mar. 23, 1948 |